Nov. 18, 1958

R. LAPSLEY 2,860,793

TRACTOR SHOVEL

Filed July 27, 1953

INVENTOR.
ROBERT LAPSLEY
BY
Kenneth C. Witt
ATTY.

Nov. 18, 1958 R. LAPSLEY 2,860,793
TRACTOR SHOVEL
Filed July 27, 1953 6 Sheets-Sheet 3

INVENTOR.
ROBERT LAPSLEY
BY
Kenneth C. Witt
ATTY.

Nov. 18, 1958

R. LAPSLEY 2,860,793

TRACTOR SHOVEL

Filed July 27, 1953

INVENTOR.
ROBERT LAPSLEY
BY
Kenneth C. Witt
ATTY.

Nov. 18, 1958 R. LAPSLEY 2,860,793
TRACTOR SHOVEL

Filed July 27, 1953 6 Sheets-Sheet 6

INVENTOR.
ROBERT LAPSLEY
BY
Kenneth C. Witt
ATTY.

United States Patent Office 2,860,793
Patented Nov. 18, 1958

2,860,793

TRACTOR SHOVEL

Robert Lapsley, Berrien Springs, Mich., assignor to Clark Equipment Company, a corporation of Michigan Application July 27, 1953, Serial No. 370,564

11 Claims. (Cl. 214—140)

My present invention relates generally to power actuated shovels, and, more particularly, it is concerned with mechanisms for elevating and tilting shovels which are embodied with vehicles such as are commonly referred to as tractor shovels or front end loaders.

The mechanism of my present invention comprises forwardly extending boom means, preferably located above the wheels, which boom means is pivoted, at its rear end, to the vehicle frame. Suitable beam means, preferably located ahead of and in line with the wheels, is pivotally mounted, intermediate of its ends, to the boom means end, at its one end, provides support for a shovel or scoop member.

It is a primary object of my present invention to provide a shovel elevating mechanism of the character described which is so arranged and constructed that when a load is being scooped up by the shovel, a substantial portion of the force component of the resistance of the load is exerted downwardly on the front wheels of the vehicle, rather than rearwardly as is the case in other known trucks.

It is another object of my present invention to provide a shovel elevating mechanism that is located above and ahead of the wheels of the vehicle and so arranged and constructed that it will not interfere with the pivoting of the front wheels of the vehicle should they be employed for steering the vehicle. With such a construction the vehicle may be provided with four-wheel drive and four-wheel steer or any possible combination of steering and driving wheels, for the shovel elevating mechanism will not interfere in any event. With such a construction it is possible also to make the frame, body, seats and other parts of the vehicle of maximum width without changing the wheel tread of the vehicle because it is not necessary to allow space between the wheels and body or frame of the vehicle for the shovel elevating mechanism.

It is a further object of my present invention to provide a shovel elevating and tilting mechanism wherein the shovel, during the initial range of elevation, is simultaneously lifted and tilted from a load engaging scooping position to a load transporting position and during a second range of elevation is maintained in the said load transporting position.

It is still a further object of my present invention to provide an elevating and tilting mechanism of the character indicated wherein load supporting means at the forward end thereof may be maintained, through the adjustment of suitable means, in a load transporting position during the full range of elevation of the load supporting means.

In order to accomplish the foregoing objects, the axis of the beam means is arranged substantially rearwardly of the shovel when the latter is in its lowermost position, and, thus, when the beam means is pivoted for moving the shovel into scooping engagement with a load, a substantial portion of the force component of the resistance of the load is exerted downwardly on the front wheels of the vehicle. Consequently, little braking force need be exerted in maintaining the vehicle stationary during a scooping operation.

The beam means of the elevating mechanism is curved in a forward direction so that it will not interfere with pivoting of the front wheels of the vehicle should it be desired to employ them for steering the vehicle. A vehicle which is steered through pivoting of its forward wheels may be more readily aligned with a load to be engaged than a vehicle which is steered by pivoting of its rear wheels. Heretofore, the linkages of known elevating mechanisms have been arranged inwardly of, and alongside of the forward wheels of the vehicle. Thus the forward wheels could not be employed for steering the vehicle with the result that the rear wheels had to be so employed which, for the reasons indicated, prevented the truck from being readily aligned with the load to be engaged.

The mechanism of my present invention further comprises first power actuated means carried by the truck and having connection with the boom means, intermediate of the ends thereof, for effecting pivotal movement of the latter, and second power actuated means carried by the boom means, and having connection with the end of the beam means opposite to that which provides the support for the shovel. The first and second power actuated means are adapted to have simultaneous connection with a common power source. The geometry of the elevating mechanism is such that the mechanical advantage of the boom means is less than the mechanical advantage of the beam means, and, thus, the second power actuated means is actuated prior to the first power actuated means in order that the beam means is pivoted prior to the boom means when elevation of the shovel is to be effected.

Additional power actuated means is carried by the beam means for effecting tilting of the shovel relative to the beam means. Associated with the power actuated tilting means is means responsive to pivotal movement of the boom means for effecting actuation of the shovel tilting means whereby the shovel is automatically tilted relative to the beam means during the range of elevation of the shovel effected by pivotal movement of the boom means, for maintaining the shovel in a load carrying position.

The elevating mechanism of my present invention is further adapted for use in connection with load carrying devices other than shovels, as, for example, a forwardly extending L-shaped load supporting apron or fork means. When such apron or fork means is employed in connection with the elevating mechanism of my present invention, it becomes desirable to maintain the fork means in substantially the same position with respect to the ground during the full range of elevation of the load supporting means. For this purpose, selectively operable means is further provided for rendering the said second power actuated means inoperative and preventing pivotal movement of the beam means relative to the boom means. Thus, as the elevating means is actuated, the load supporting means will, during the full range of elevation, be tilted simultaneously relative to the beam means and the load supporting forks will be maintained in substantially the same load transporting position.

Now, in order to acquaint those skilled in the art with the manner of constructing and using elevating and tilting mechanisms in accordance with the principles of my present invention, I shall describe in connection with the accompanying drawings a preferred embodiment of my present invention.

In the drawings:

Figure 5 is a diagrammatic showing of the fluid circuit of the elevating and tilting mechanism of my present invention.

Figure 1:
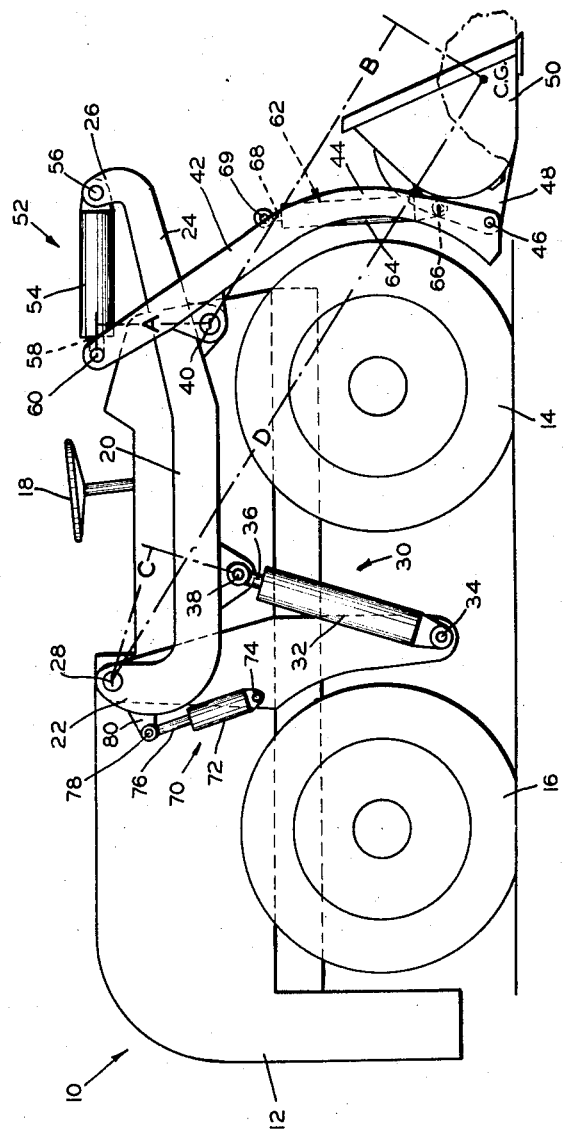
Figures 1 through 4 are side elevational views of my present invention embodied with a mobile vehicle and a power actuated shovel with the latter being shown in various operating positions.

Referring now to the drawings, there is indicated generally by the reference 10 a mobile vehicle or industrial truck having a main frame 12. The truck 10 is provided with forward wheels 14 and rear wheels 16. Preferably, the forward wheels 14 are provided for steering the vehicle, and, when so employed, are operatively associated with a hand steering wheel 18 disposed forwardly of an operator's seat. Suitable prime mover and transmission means (not shown) are provided for driving the rear wheels 16, or the front wheels 14 or all four wheels, as desired.

Arranged at either side of the truck 10 are boom members 20 comprising upturned end portions 22, forwardly and inclined upwardly extending portions 24, and forward upturned portions 26. The rear upturned portions 22 are pivotally mounted at the ends of a transversely extending shaft 28 that is suitably journaled in the truck frame 12. While only one boom member 20 is visible in the drawing, namely the right hand one, it will be understood that there is another similar boom member on the left hand side of the machine. Other parts referred to hereinbelow also are duplicated on both sides of the machine, as will be apparent.

Suitable power actuated means, indicated generally at 30, are provided for effecting pivotal movement of the boom members 20 about the pivotal mounting 28. Each power actuated means 30 comprises hydraulic piston and cylinder assembly means having a cylinder 32 pivotally mounted at 34 to the truck frame 12, and a piston rod 36 pivotally mounted at 38 to a boss on the adjacent boom member 20 intermediate of the ends thereof.

A pair of beam members 42 are pivotally mounted, intermediate of their ends, one to each of the boom members 20 about stub shafts 40. The beam members 42 are formed with arcuate or curved portions 44 to which, at the lower ends, are pivotally mounted, about a transverse shaft 46, the rearwardly extending, horizontally spaced apart flange members 48 of a scoop or shovel 50. The beam members 42 are curved in a forward direction so that they will not interfere with pivoting of the front wheels 14 during steering of the vehicle.

Power actuated means indicated generally at 52 is arranged between each boom member 20 and the associated beam member 42 for effecting pivotal movement of the beam members relative to the boom members. Each power actuated means 52 assumes the form of hydraulic piston and cylinder assembly means, and, more specifically, comprises a cylinder 54 which is pivotally mounted at 56 to the forward upturned end 26 of the boom member 20. Each hydraulic actuating assembly 52 further comprises a piston rod 58 which is pivotally mounted at 60 to the end of the beam member 42 opposite the end that supports the shovel 50.

It will be recognized by those skilled in the art that the boom members 20 serve as third class levers while the beam members 42 serve as first class levers. At this point, I also wish to call attention to the fact that the resistance arm B of the beam members 42 is approximately three times the effort arm A, and the resistance arm D of the boom members 20 is approximately five times the effort arm C. As will be explained in greater detail hereinafter, the cylinders 32 and 54 of the hydraulic actuating assembly means 30 and 52 are adapted to be connected simultaneously to a common source of fluid pressure, and since the mechanical advantage of the boom members 20

$$\frac{C}{D}$$

is less than the mechanical advantage of the beam members 42

$$\frac{A}{B}$$

the hydraulic actuating assemblies 52 are actuated prior to the hydraulic actuating assemblies 30. Consequently, the beam members 42 are pivoted prior to the boom members 20, when elevation of the shovel 50 is being effected.

A power actuated assembly indicated generally by the reference numeral 62 is secured to one of the beam members 42 and is operative for effecting tilting of the shovel 50 relative to the beam members 42. The power actuated means 62 is in the form of hydraulic piston and cylinder assembly means and comprises a cylinder 64 which is pivotally mounted at 66 to the rearwardly extending flange member 48 of the shovel 50. The hydraulic actuating assembly means 62 further comprises a piston rod 68 which is pivotally mounted at 69 to the adjacent beam member 42.

A shovel tilt synchronizer assembly 70, in the form of hydraulic piston and cylinder assembly means, is associated with the afore-described power actuated shovel tilting means 62, and comprises a cylinder 72 which is pivotally mounted at 74 to the truck frame 12 and a piston rod 76 which is pivotally mounted at 78 to a flange member 80 secured to the rear upturned portion 22 of the boom member 20.

Referring now to Figure 5, there is shown diagrammatically the fluid circuit which is associated with the afore-described power actuated mechanisms 30, 52, 62, and 70. The fluid circuit comprises a pump 82 which is driven by the prime mover of the industrial truck 10. The discharge or pressure side of the pump 82 has connection through a fluid line 84 with annular grooves 86 and 88 formed respectively in valve blocks 90 and 92. A conventional relief valve 94 is interposed in the fluid line 84 for preventing fluid pressure in the circuit from exceeding a predetermined safe value.

Valve openings 96 and 98 are formed respectively in the valve blocks 90 and 92 and, since the valve blocks are arranged within a sump tank 100, the openings 96 and 98 communicate with the interior thereof. The intake side of the pump 82 also communicates with the interior of the sump tank 100 through a fluid line 101 and a filter screen 103. In addition to having the annular groove 86, the valve block 90 is formed with annular grooves 102 and 104, and the valve block 92, in addition to having the annular groove 88, is formed with annular grooves 106 and 108.

Slidably mounted in the valve opening 96 of the valve block 90 is a spool valve 110 having a central annular channel 112 formed therein. A spool valve 114, similar to the spool valve 110, is slidably mounted in the opening 98 of the valve block 92 and has formed therein a central annular channel 116. The spool valves 110 and 114 are adapted to be moved axially within the valve blocks 90 and 92 by means of control levers 118 and 120, which are arranged at a convenient point adjacent the operator's seat of the truck 10.

The annular groove 102 formed in the valve block 90 communicates with the lower ends of the cylinders 64 and 72 through a fluid line 122. The annular groove 102 further communicates through a fluid line 124 with a fluid pressure relief valve 126. The annular groove 104 formed in the valve block 90 communicates with the upper ends of the cylinders 64 and 72 through a fluid line 128. The annular groove 104 also communicates through a line 130 with a fluid pressure relief valve 132.

The annular groove 106 formed in the valve block 92 communicates with the one ends of the cylinders 32 and 54 through a fluid line 134. The annular groove 108 formed in the valve block 92 communicates with the other ends of the cylinders 32 and 54 through a fluid line 136. For the sake of clarity, only one pair of assemblies 30 and 52 are shown in Figure 5. It is to be understood, however, that there are two pair of assemblies 30 and 52, one pair being arranged on either side of the truck 10. Interposed respectively in the fluid lines 134 and 136, adjacent to the cylinder 54, are shut off valves 138 and 140 which are provided for a purpose to be described more fully hereinafter.

In the operation of the mechanism of my present invention, the shovel 50 may be disposed in a load scooping position, as shown in Figure 1, by suitable manipulation of the control levers 118 and 120. With the shovel 50 in the position shown in Figure 1, the truck 10 may be maneuvered until the shovel 50 is disposed closely adjacent to the load that is to be engaged thereby. Assuming that loose material is to be picked up by the scoop 50, the operator of the vehicle need only actuate the control lever 120 for moving the spool valve 114 to the left from the position shown in Figure 5. Such movement of the valve 114 places the fluid line 134 in communication with the pressure side of the fluid pump 82 through the fluid line 84, while the fluid line 136 is simultaneously placed into communication with the interior of the sump tank 100. Thus, fluid under pressure will be admitted through the fluid line 134 to the one ends of the cylinders 32 and 54 of the hydraulic actuating assembly means 30 and 52. Since, as explained in detail hereinbefore, the mechanical advantage of the boom members 20 is less than the mechanical advantage of the beam members 42, fluid under pressure will act first to distend the piston rods 58, as the piston rods 58 offer less resistance to the flow of fluid than the piston rod rods 36. As the piston rods 58 are distended, the beam members 42 and the shovel 50 are pivoted from the position shown in Figure 1 to the position shown in Figure 2.

As will be understood by those skilled in the art, since the pivotal axis 40 of the beam members 42 lies substantially rearwardly of the center of resistance offered by the load being engaged by the shovel 50, a substantial portion of the force component of the resistance of the load being engaged will be exerted downwardly on the front wheels 14 of the truck 10. Thus, only a slight braking force need be exerted in maintaining the truck 10 stationary during the described scooping operation.

Figure 2:
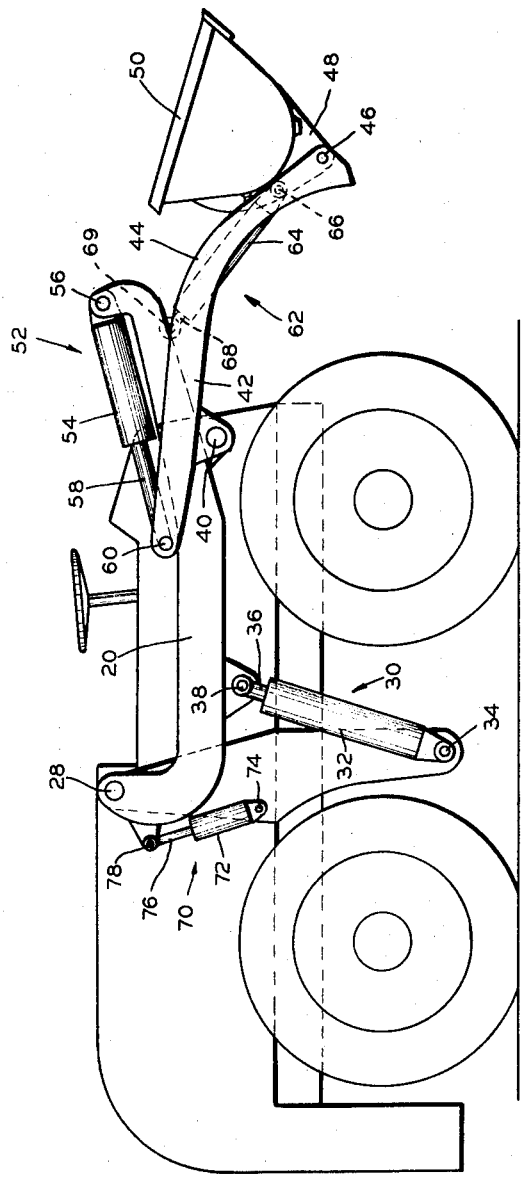

It is to be observed that as the shovel 50 is elevated from the position shown in Figure 1 to the position shown in Figure 2, the tilt synchronizer assembly 70 remains inoperative and the shovel 50 is tilted relative to the ground from a load engaging scooping position to a load transporting position. After the shovel 50 has been disposed in the load transporting position shown in Figure 2, upon completion of the initial range of elevation thereof, it is desirable to maintain the shovel in this position relative to the ground during the second range of elevation.

Figure 3:
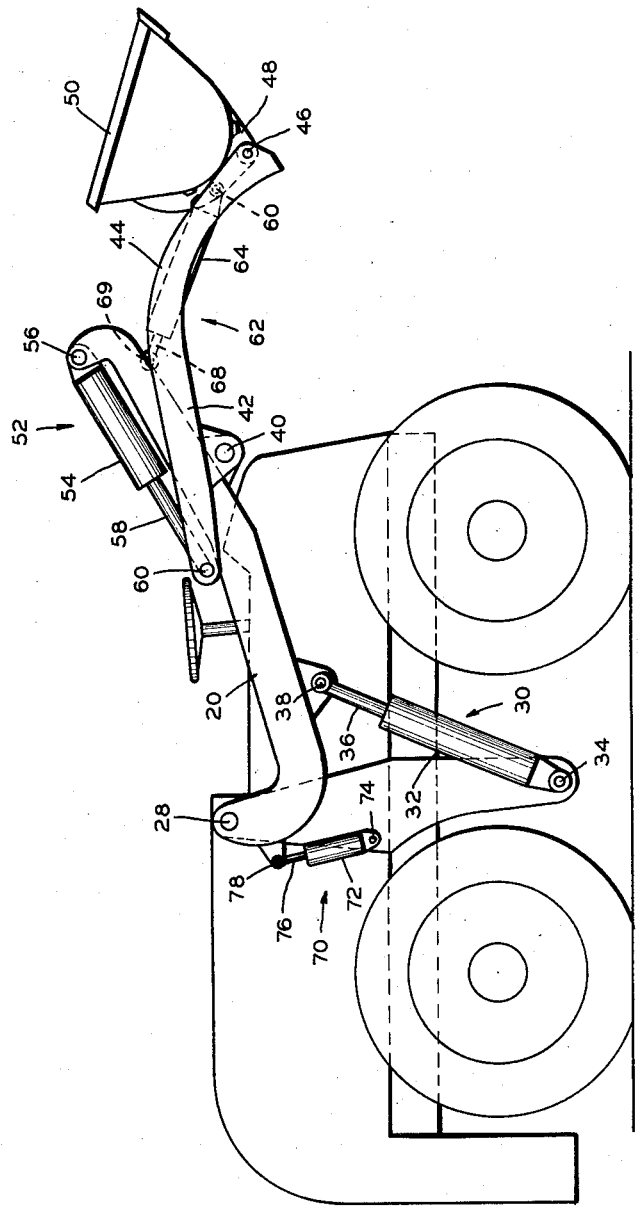
Figure 4:
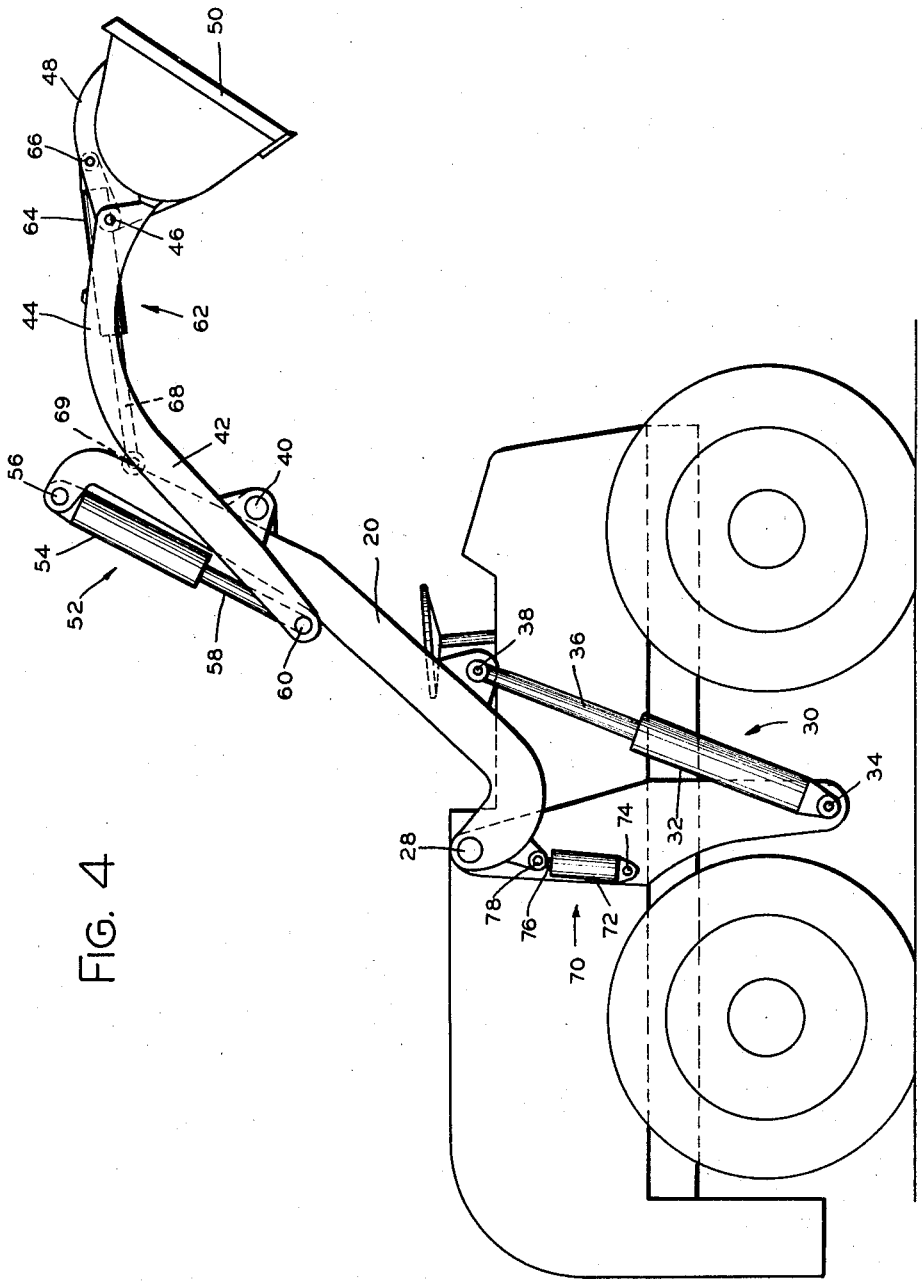

In order to maintain the shovel 50 in a predetermined position relative to the ground, upon further elevation thereof, the tilt synchronizer assembly 70 is provided and has communication with the power actuated tilt assembly 62 through the afore-described fluid lines 122 and 128, the arrangement being such that as the boom members 20 are pivoted from the position shown in Figure 2 to the positions shown in Figures 3 and 4, by the actuation of the hydraulic assemblies 30, the piston rod 76 of the synchronizer assembly 70 is moved inwardly of the cylinder 72 for forcing fluid contained therein through the line 122 to the one end of the cylinder 64 of the power actuated tilt assembly 62. Such movement of the fluid through the fluid line 122 forces the cylinder 64 to move outwardly relative to the piston rod 68 for effecting pivotal movement of the shovel 50 about the pivot point 46. Thus, during the second range of elevation of the shovel 50 the latter is tilted synchronously with pivotal movement of the boom members 20 and thus is maintained in the predetermined load transporting position. It is to be understood that the shovel may be moved through the two ranges of elevation in a continuous automatic sequence.

If it is desired to effect dumping of the contents of the shovel 50, the operator need only effect actuation of the control lever 118 for moving the spool valve 110 to the left, from the position shown in Figure 5, for selectively admitting fluid under pressure to the fluid line 122 which will cause movement of the cylinder 64 relative to the piston rod 68. Such actuation of the control lever 118 will effect pivotal movement of the shovel 50 from the position shown in Figure 3 to the position shown in Figure 4.

The shovel 50 may be returned to its normal load transporting position shown in Figure 3 by actuating the control lever 118 for moving the spool valve 110 to the right from the position shown in Figure 5. Such actuation of the valve 110 causes fluid under pressure to be admitted to the cylinder 64 through the fluid line 128 for causing the cylinder 64 to move toward the pivotal mounting 69. During the afore-described actuation of the valve 110, no movement of the piston rod 76 occurs as the latter is held relatively stationary by the boom member 20 which is maintained in a fixed position by the hydraulic actuating assembly 30.

Upon counter-clockwise pivoted movement of the shovel 50, as just described, caused by moving valve 110 to the right for placing fluid line 122 under bleed and fluid line 128 under pressure, the piston rod 68 will be returned to the position shown in Figure 5. Now, as the boom members 20 are lowered, and the piston rod 76 of the synchronizer assembly is urged outwardly of the cylinder 72, the pressure on the fluid within the fluid line 128 will increase, since the piston rod 68 of the tilt assembly 62 is already at one end of its travel in its innermost extreme position. At such time, the pressure relief valve 132 serves to prevent the pressure in the line 128 from exceeding a predetermined safe valve, as the boom members 20 are pivoted with the assemblies 62 and 70 out of phase. The safety relief valve 126 likewise serves to prevent the pressure in the line 122 from exceeding a predetermined safe valve when the boom members 20 are pivoted with the assemblies 62 and 70 out of phase.

Figure 6:
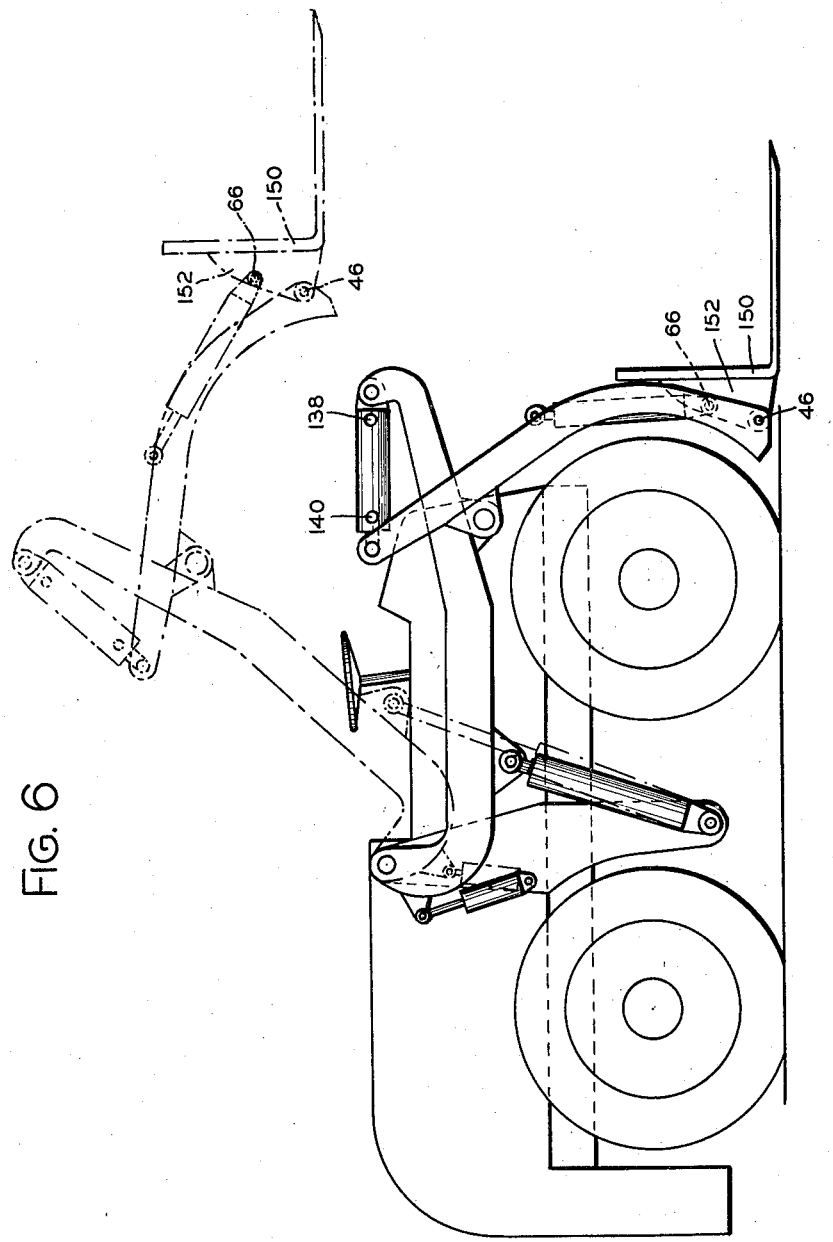
Figure 6 is a side elevational view of my present invention embodied with a mobile vehicle and load supporting fork means with the latter being shown in two operating positions.

The afore-described elevating mechanism of my present invention is not only adapted for use in connection with a shovel, but also may be employed in connection with a forwardly extending L-shaped load supporting apron or fork means such as is shown at 150 in Figure 6. The fork means 150 is provided with rearwardly extending spaced apart flange members 152 which are pivotally mounted about the shaft 46 extending between the lower ends of the beam members 42. The flanges 152 further have connection at pivot point 66 with the cylinder 64 of the power tilting mechanism 62. Although it is desirable to tilt a shovel, which is engaged in scooping up a load, from a scooping position to a load transporting position, such change in position of the load supporting member relative to the ground is neither necessary, nor desirable, when load supporting fork means is employed such as shown in Figure 6. Accordingly, when the load supporting fork means 150 is incorporated with the elevating mechanism on my present invention, the valves 138 and 140, which are interposed in the fluid lines 134 and 136, are closed for preventing the flow of the fluid into the cylinder 54 of the hydraulic actuating assembly means 52. Consequently, no pivotal movement of the beam members 42 relative to the boom members 20 can occur and, as a result the synchronizer assembly 70, is, during the entire range of elevation of the fork means 150, operable for pivoting the fork means 150 relative to the beam members 42 for maintaining the fork means 150 in a normal load transporting position.

Now, while I have shown and described what I believe to be a preferred embodiment of my present invention, it will be understood that various rearrangements and modifications may be made therein without departing from the spirit and scope of my present invention.

I claim:

1. For use with a vehicle having a frame and wheels, forwardly extending boom means pivotally mounted at its rear end to the frame, first power actuated means carried by the vehicle and having connection with said boom means intermediate of the ends thereof for effecting pivotal movement of the latter, beam means pivotally mounted intermediate of its ends to said boom means at a location intermediate the ends of the latter, second power actuated means carried by said boom means and having connection between the forward end thereof and one end of said beam means for effecting pivotal movement of the latter, a shovel carried by said beam means at the other end thereof, said shovel being arranged substantially forwardly of the pivotal mounting of said beam means to said boom means so that a substantial portion of the force component of the resistance of a load being engaged by said shovel during pivoting of said beam means is exerted downwardly on the forward wheels of the vehicle, said first and second power actuated means adapted to have simultaneous connection with a common power source, and the mechanical advantage of said boom means being less than the mechanical advantage of said beam means so that said second power actuated means is actuated prior to said first power actuated means in order that said beam means is pivoted prior to said boom means when elevation of the said shovel is effected.

2. For use with a vehicle having a frame, forwardly extending boom means pivotally mounted to the frame, means carried by the vehicle and having connection with said boom means for effecting pivotal movement of the latter, beam means pivotally mounted to said boom means at a location intermediate the ends of both, means connected between the forward end of said boom means and one end of said beam means for effecting pivotal movement of the latter, a load carrying device carried by said beam means, means carried by said beam means for tilting said device relative to said beam means, and said last named means being responsive to pivotal movement of said boom means so that said device is automatically and synchronously tilted relative to said beam means while said boom means is being pivoted so as to maintain the device in a predetermined angular position relative to the ground.

3. For use with a vehicle having a frame, forwardly extending boom means pivotally mounted to the frame, means carried by the vehicle and having connection with said boom means for effecting pivotal movement of the latter, beam means pivotally mounted to said boom means at a location intermediate the ends of both, means carried by said boom means and connected between the forward end of the boom means and one end of the said beam means for effecting pivotal movement of the latter, a shovel carried by said beam means, means carried by said beam means for tilting said shovel relative to said beam means, and means responsive to pivotal movement of said boom means for effecting actuation of said shovel tilting means whereby said shovel is automatically tilted relative to said beam means while said boom means is being pivoted so as to maintain the shovel in any predetermined angular position relative to the ground.

4. For use with a vehicle having a frame, forwardly extending boom means pivotally mounted at its rear end to the frame, first power actuated means carried by the vehicle and having connection with said boom means intermediate of the ends thereof for effecting pivotal movement of the latter, beam means pivotally mounted intermediate of its ends to said boom means at a location intermediate the ends of the latter, second power actuated means carried by said boom means and connected between the forward end of the boom means and one end of said beam means for effecting pivotal movement of the latter, a shovel carried by said beam means at the other end thereof, first hydraulic actuating assembly means carried by said beam means for tilting said shovel relative to said beam means, second hydraulic actuating assembly means between said frame and said boom means and responsive to pivotal movement of the latter, hydraulic fluid lines interconnecting said first and second hydraulic actuating assembly means, said second hydraulic actuating assembly means serving to actuate said first hydraulic actuating assembly means during pivoting of said boom means so as to automatically tilt said shovel relative to said beam means for maintaining the shovel in any predetermined angular position relative to the ground.

5. For use with a vehicle having a frame, forwardly extending boom means pivotally mounted at its rear end to the frame, first power actuated means carried by the vehicle and having connection with said boom means intermediate the ends thereof for effecting pivotal movement of the latter, beam means pivotally mounted intermediate of its ends to said boom means at a location intermediate the ends of the latter, second power actuated means connected between the outer end of the said boom means and one end of said beam means for effecting pivotal movement of the latter, a shovel carried by said beam means at the other end thereof, said first and second power actuated means adapted to have simultaneous connection with a common power source, and the mechanical advantage of said boom means being less than the mechanical advantage of said beam means so that said second power actuated means is actuated prior to said first power actuated means in order that said beam means is pivoted prior to said boom means when elevation of the said shovel is effected.

6. For use with a vehicle having a frame, forwardly extending boom means pivotally mounted at its rear end to the frame, first power actuated means carried by the vehicle and having connection with said boom means intermediate of the ends thereof for effecting pivotal movement of the latter, beam means pivotally mounted intermediate of its ends to said boom means at a location intermediate the ends of the latter, second power actuated means carried by said boom means and connected between the forward end thereof and one end of said beam means for effecting pivotal movement of the latter, a shovel carried by said beam means at the other end thereof, said first and second power actuated means adapted to have simultaneous connection with a common power source, the mechanical advantage of said boom means being less than the mechanical advantage of said beam means so that said second power actuated means is actuated prior to said first power actuated means in order that said beam means is pivoted prior to said boom means when elevation of the said shovel is effected, means carried by said beam means for tilting said shovel relative to said beam means, and said last named means being responsive to pivotal movement of said boom means so that said shovel is automatically tilted relative to said beam means during the portion of elevation of said shovel effected by pivotal movement of said boom means for maintaining the shovel in a predetermined angular position relative to the ground during this range of elevation.

7. For use with a vehicle having a frame, forwardly extending boom means pivotally mounted at its rear end to the frame, first power actuated means carried by the vehicle and having connection with said boom means intermediate of the ends thereof for effecting pivotal movement of the latter, beam means pivotally mounted intermediate of its ends to said boom means at a location intermediate the ends of the latter, second power actuated means carried by said boom means and connected between the forward end of the boom means and one end of said beam means for effecting pivotal movement of the latter, a shovel carried by said beam means at the other end thereof, said first and second power actuated means adapted to have simultaneous connection with a common power source, the mechanical advantage of said boom means being less than the mechanical advantage of said beam means so that second power actuated means is actuated prior to said first power actuated means in order that said beam means is pivoted prior to said boom means when elevation of said shovel is effected, means carried by said beam means for tilting said shovel relative to said beam means, and means responsive to pivotal movement of said boom means for effecting actuation of said shovel tilting means whereby said shovel is automatically and synchronously tilted relative to said beam means for maintaining the shovel in a predetermined angular position relative to the ground during the range of elevation of said shovel effected by pivotal movement of said boom means.

8. For use with a vehicle having a frame, forwardly extending boom means pivotally mounted at its rear end to the frame, first hydraulic actuating assembly means carried by the vehicle and having connection with said boom means intermediate the ends thereof for effecting pivotal movement of the latter, beam means pivotally mounted intermediate of its ends to said boom means, second hydraulic actuating assembly means carried by said boom means and having connection with one end of said beam means for effecting pivotal movement of the latter, a shovel carried by said beam means at the other end thereof, said first and second hydraulic actuating assembly means adapted to have simultaneous connection with a common source of fluid pressure, the mechanical advantage of said boom means being less than the mechanical advantage of said beam means so that said second hydraulic actuating assembly means is actuated prior to said first hydraulic actuating assembly means in order that said beam means is pivoted prior to said boom means when elevation of the shovel is effected, third hydraulic actuating assembly means carried by said beam means for tilting said shovel relative to said beam means, fourth hydraulic actuating assembly means between said frame and said boom means and responsive to pivotal movement of the latter, hydraulic fluid lines interconnecting said third and fourth hydraulic actuating assembly means, said fourth hydraulic actuating assembly means serving to actuate said third hydraulic actuating assembly means during elevation of said shovel in the range of elevation caused by pivotal movement of said boom means so as to automatically tilt said shovel relative to said beam means for maintaining the shovel in a predetermined angular position relative to the ground.

9. For use with a vehicle having a frame, forwardly extending boom means pivotally mounted at its rear end to the frame, first power actuated means carried by the vehicle and having connection with said boom means intermediate of the ends thereof for effecting pivotal movement of the latter, beam means pivotally mounted intermediate of its ends to said boom means at a location intermediate the ends of the latter, second power actuated means carried by said boom means and connected between the forward end of the boom means and one end of said beam means for effecting pivotal movement of the latter, load supporting means carried by said beam means at the other end thereof, said first and second power actuated means adapted to have simultaneous connection with a common power source, the mechanical advantage of said boom means being less than the mechanical advantage of said beam means so that said second power actuated means is normally actuated prior to said first power actuated means in order that said beam means is pivoted prior to said boom means when elevation of the said load supporting means is effected, and means for interrupting communication between said second power actuated means and said common power source so that only said first power actuated means may be employed for elevating said load supporting means.

10. For use with a vehicle having a frame, forwardly extending boom means pivotally mounted at its rear end to the frame, first power actuated means carried by the vehicle and having connection with said boom means intermediate of the ends thereof for effecting pivotal movement of the latter, beam means pivotally mounted intermediate of its ends to said boom means, second power actuated means carried by said boom means and having connection with one end of said beam means for effecting pivotal movement of the latter, load supporting means carried by said beam means at the other end thereof, said first and second power actuated means adapted to have simultaneous connection with a common power source, the mechanical advantage of said boom means being less than the mechanical advantage of said beam means so that said second power actuated means is actuated prior to said first power actuated means in order that said beam means is pivoted prior to said boom means when elevation of the said load supporting means is effected, means carried by said beam means for tilting said load supporting means relative to said beam means, means responsive to pivotal movement of said boom means for effecting actuation of said load supporting tilting means whereby said load supporting means is automatically and synchronously tilted relative to said beam means for maintaining said load supporting means in a predetermined angular position relative to the ground during the range of elevation of said load supporting means effected by pivotal movement of said boom means, and means for interrupting communication between said second power actuated means and said common power source whereby the entire range of elevation of said load supporting means is effected by said first power actuated means and said load supporting means is maintained in a predetermined angular position relative to the ground during the entire range of such elevation.

11. For use with a vehicle having a frame, forwardly extending boom means pivotally mounted at its rear end to the frame, first fluid pressure actuated means carried by the vehicle and having connection with said boom means for effecting pivotal movement of the latter, beam means pivotally mounted intermediate of its ends to said boom means at a location intermediate the ends of the latter, second fluid pressure actuated means connected between the front end of said boom means and one end of said beam means for effecting pivotal movement of the latter on the boom means, load engaging means carried by said beam means at the other end thereof, said first and second fluid pressure actuated means adapted to have simultaneous connection with a common source of fluid pressure, and the said two fluid pressure actuated means, boom and beam means, and load engaging device being of suitable sizes and weights such that when fluid pressure is applied simultaneously to the two fluid pressure actuated means the second fluid pressure actuated means acts first to pivot the beam means with respect to the boom means and thereafter the first fluid pressure actuated means operates to pivot the boom means with respect to the frame.

References Cited in the file of this patent

UNITED STATES PATENTS

| | | |
|---|---|---|
| 1,371,344 | Brackett | Mar. 15, 1921 |
| 2,348,899 | Guignard et al. | May 16, 1944 |
| 2,482,612 | Drott et al. | Sept. 20, 1949 |
| 2,613,822 | Stanley | Oct. 14, 1952 |
| 2,630,231 | Klinge | Mar. 3, 1953 |
| 2,718,312 | Pilch | Sept. 20, 1955 |